Patented Jan. 24, 1939

2,145,108

UNITED STATES PATENT OFFICE 2,145,108

PROCESS OF MAKING FOOD PRODUCTS AND PRODUCTS PRODUCED THEREBY

Charles R. Cooper, San Francisco, Calif., assignor to himself and Augusta S. Cooper, San Francisco, Calif., jointly No Drawing. Application July 21, 1936, Serial No. 91,789

2 Claims. (Cl. 99—144)

This invention relates to processes of preparing foodstuffs and products resulting therefrom, and more particularly to processes of preparing foodstuffs for use as catsup bases or the like and novel products produced thereby.

In the preparation of bases for catsup and the like in which it has been found preferable to use a fruit such as the tomato, relatively long and expensive periods of concentration have been required in the treatment of tomato pulp by reason of its relatively low soluble solid content which runs about 5.5 to 6.0 per cent. The mineral content and sugar content are also relatively low, averaging only about 0.5 per cent and 3.5 per cent respectively. Moreover, the relatively long periods of concentration hitherto considered necessary have resulted in cooking of the pulp with an undesirable alteration of the flavor. Furthermore, even in the same season of the year, it has not always been possible to secure tomatoes of like color. Consequently, to produce a product of uniform color, it has been necessary to resort to artificial coloring.

In overcoming the aforesaid and other disadvantages of the prior art, it is a major object of my invention to provide a novel catsup base of improved characteristics at less expense than heretofore.

A further object of my invention is to provide a novel process for the manufacture of foodstuffs for use as bases for catsups, sauces and the like or as a puree wherein improved products can be produced at less expense.

Still a further object of my invention is to provide a novel beverage of pleasing taste and healthful characteristics embodying both the beneficial characteristics of tomato juice and beet juice.

I have discovered that the disadvantages aforementioned and others can be eliminated by the use of certain vegetable pulps in combination with fruit pulp such as tomato pulp, as for instance, the pulp of the red beet. The pulp of the red beet has a positive and uniformly red color and a soluble solid content of about 11.5 per cent. The pulp of the red beet has a mineral content of about 1.0 per cent, largely iron and calcium which are very beneficial from a dietetic standpoint. The red beet pulp is also characterized by a relatively high sucrose content which averages about 7.0 per cent.

By the addition of a vegetable pulp, such as the pulp of the red beet, to tomato pulp in predetermined proportions, I not only increase the soluble solid content of the whole but in addition increase the mineral and sugar content to an extent wherein worth while economies are effected.

As a specific example of my invention as applied to the manufacture of tomato catsup, tomatoes are pressed to remove the juice and put through a so-called cyclone which removes skins, seeds and insoluble solids, leaving a tomato liquid and pulp averaging about 5.5 to 6.0 per cent soluble solids. Since this pulp is much too thin to be employed as a catsup base, it is necessary to separate the juice from the pulp or concentrate the pulp as by heating which is not only an expensive step, becoming more so as the concentration proceeds, but is also a step wherein the pulp is cooked to some extent and the flavor thereof undesirably altered. Valuable elements present in the pulp are also lost by the long concentration.

To avoid the concentrating step and at the same time obtain an improved product, I prepare a pulp of the red beet by first mechanically pressing red beets to remove the juice therefrom, and passing the beets through a cyclone or similar pulping device, obtaining a pulp about 11.5 per cent soluble solids and about 1.0 per cent mineral content. The red beet pulp is then combined with the tomato pulp in a proportion of about 45 per cent beet pulp to 55 per cent tomato pulp, although it is to be understood that this proportion may be varied in accordance with the final product desired as regards color, soluble solid content, mineral content and like characteristics. As stated, I preferably employ about 45 per cent beet pulp to 55 per cent tomato pulp, thus obtaining a catsup base with a soluble solid content of about 8.2 per cent or 2.7 per cent more soluble solids than in the original tomato pulp, this gain being obtained without the expense and trouble incident to the concentration of the original tomato pulp by heat.

Since the market price of pulp for the manufacture of catsup is determined by its solid soluble content, it is evident that I obtain a pulp worth considerably more than the original tomato pulp at no additional expense.

If, for some purposes, it is desired to obtain a pulp of higher soluble solid content as, for example, about 12 per cent, the mixture of the pulps may be concentrated by heat, the length of time required being materially less than would be required in starting with a pure tomato pulp of 5.5 per cent soluble solid content.

As an example of the further economy of my process and the products produced thereby, I have discovered that the tomato juice and beet juice obtained by the mechanical expression of the original tomato and beets, when mixed, makes an excellent beverage of uniform attractive color, palatable flavor and of high value in beneficial acids, minerals and vitamins.

To further illustrate exemplary economies of the process of my invention, I have found that the sugar content of the resultant pulp is much higher than that of pure tomato pulp as the latter averages about 3.5% sucrose. Red beet pulp averages about 7.0% sucrose. Therefore, in a pulp of the type I have described there would be about 5.75% sucrose or about 45% more than in tomato pulp. This is an important characteristic of my composition since commercial granulated sugar is extensively used in all catsup formulas. In fact in some brands, the cost of sugar employed is equal to that of the tomato content.

My novel catsup base retains its genuine tomato flavor to a marked degree, due to the minimum period of concentration involved, and also the distinctive flavor of fresh red beets which has been found to be a very appealing and palatable combination.

By using red beet pulp, a catsup base is obtained of a much stronger red color than the straight tomato base. As is well known, this is a prerequisite of a strictly fancy catsup and presents a problem because of the varying colors of tomatoes in various seasons and even in the different periods of harvest in the same season, rendering the same unfit for catsup. The use of red beet pulp eliminates this problem and insures a uniform bright red color through the harvest and at all seasons.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of producing an improved catsup product with a minimum heat treatment to preserve the constituents thereof in substantially original condition which comprises pressing tomatoes and removing insoluble solids therefrom to provide a tomato pulp formed of liquid and soluble solids, pressing beets and removing insoluble solids therefrom to provide a beet pulp, and mixing said beet pulp and said tomato pulp to provide a pulp with a soluble solid content approximately that of the usual tomato catsup base and with a viscosity in excess of the viscosity of said base whereby a catsup base of high soluble solid content is secured without the necessity of relatively prolonged concentration and consequent loss of flavor.

2. The method as set forth in claim 1 wherein beet pulp is added in an amount of about 82 per cent of the tomato pulp.

CHARLES R. COOPER.